Figure 1:
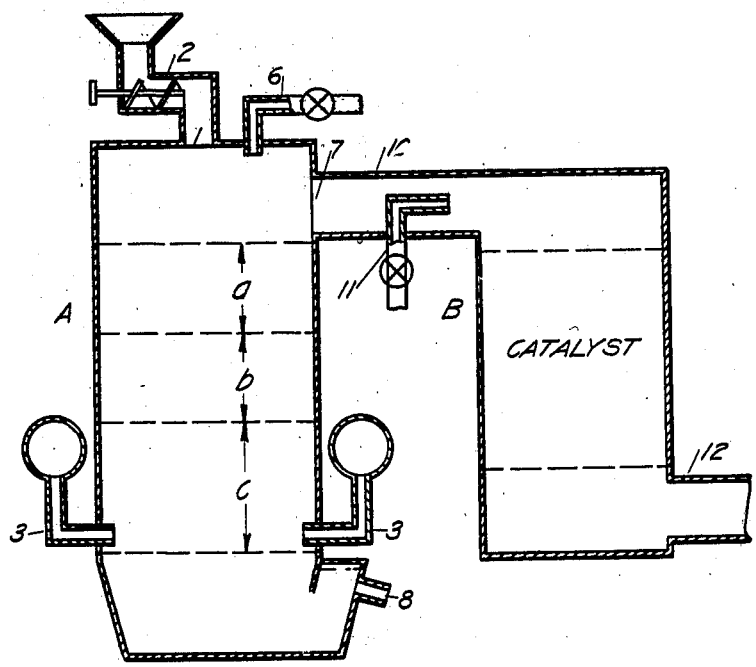

March 18, 1930. R. C. BENNER ET AL 1,751,068
PROCESS OF PRODUCING ELEMENTAL SULPHUR
Filed Sept. 8, 1926

INVENTORS
RAYMOND C. BENNER
ALFRED P. THOMPSON
BY Forbes Sileby
ATTORNEY

Patented Mar. 18, 1930

1,751,068

UNITED STATES PATENT OFFICE

RAYMOND C. BENNER, OF BAYSIDE, AND ALFRED PAUL THOMPSON, OF JACKSON HEIGHTS, NEW YORK, ASSIGNORS TO GENERAL CHEMICAL COMPANY, OF NEW YORK, N. Y., A CORPORATION OF NEW YORK

PROCESS OF PRODUCING ELEMENTAL SULPHUR

Application filed September 8, 1926. Serial No. 134,163.

This invention relates in general to the production of elemental sulphur and more particularly to the production of elemental sulphur from sulfide ores or from the sulphur dioxide and sulfide ores.

In our co-pending U. S. applications Serial Nos. 134,160, 134,161, and 134,162, all filed September 8, 1926, we have disclosed and claimed methods for the production of elemental sulphur by contacting air or a mixture of air and sulphur dioxide with a mixture of a sulfide ore and a carbonaceous fuel preferably comprising hydrocarbons. In carrying out such methods, we have contemplated operating at such temperatures that the ash and cinder resulting from the reduction process might be eliminated from the system in a substantially solid state, either sintered or unsintered. In our present application, which comprises a modification of the process disclosed in these co-pending applications, our invention consists in a process for the production of elemental sulphur from sulfide ores or from sulphur dioxide and sulfide ores, wherein the sulfide ore is admixed with a carbonaceous fuel comprising hydrocarbons and contacted with an oxidizing gas which may comprise sulphur dioxide, and the temperature of the reduction process is maintained sufficiently high to fuse the non-volatile products, which may be removed as a liquid. Our invention further contemplates the addition to the charge of suitable proportions of lime and silica or other slagging material whereby the non-volatile products (ash and cinder) may be tapped off as a slag.

The principal objects of our present invention are, first, to provide an efficient and economical process for the production of elemental sulphur directly from sulfide ores wherein substantially complete recovery of all sulphur in the ore is obtained; secondly, to provide a more economical process for the reduction of sulphur dioxide containing gases such as gases from smelters or roasting furnaces, wherein a substantial portion of a cheaper and more available fuel than coal, namely sulfide ores, may be employed as a heating and reducing agent; and third, to provide a process for the recovery of sulphur from sulfide ores wherein the non-volatile products, i. e. ash and cinder, resulting from the reduction may be quickly and easily removed.

In the production of elemental sulphur by the reduction of sulphur dioxide with a mixture of sulfide ore and carbonaceous fuel, or in the production of sulphur directly from sulfide ores by admixing with the ore a considerable portion of carbonaceous fuel and contacting such mixture with air, certain advantages may be obtained when carrying out the process at comparatively high temperatures.

When carrying out the process, as disclosed in our co-pending applications above referred to, at comparatively low temperatures, the ash and cinder are discharged in the solid state either sintered or unsintered. As the proportion of sulfide ore is increased in the solid fuel mixture, certain difficulties are encountered in discharging, in the solid state, the increasing proportion of cinder. To overcome these difficulties and to provide a process whereby the ash and cinder may be quickly and easily removed, we conduct the reduction process at a sufficiently high temperature, preferably about 1200° C. or above, to fuse the ash and cinder either with or without the addition of a slagging material. The resultant slag may be removed by simply tapping off at suitable intervals. Furthermore, when the process is carried out at high temperatures, and the ash and cinder discharged as a slag, the rate of reaction is very considerably increased so that materially greater gas speeds are obtainable.

According to our preferred process, we add to the charge of sulfide ore and carbonaceous material, lime and silica in suitable amounts as hereinafter specified. This slagging material lowers the temperature required for fusion of the ash and cinder and also aids in the desulphurizing of the sulfide ore.

Figure 2:
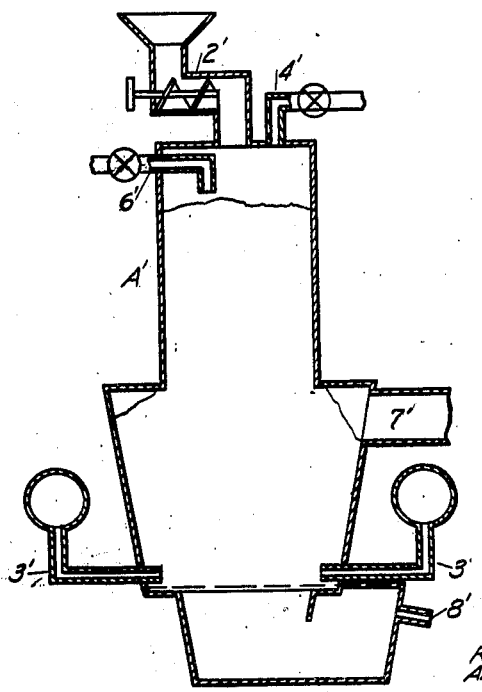

The accompanying drawings represent diagrammatically two general arrangements of apparatus for carrying out our novel process. Figure 1 shows schematically one type of reduction chamber wherein the gas and solids are in counter-current flow, together with a catalyst chamber, while Figure 2 shows a modified form of reduction chamber wherein the solid fuel is first in co-current and finally in counter-current flow with a gaseous medium. Referring particularly to Figure 1, the reduction chamber A is provided at the top with an inlet 1 through which a mixture of carbonaceous fuel, as for example, bituminous coal, and a sulfide ore or ores, as for example pyrites, in the granular state, either coarse or finely divided, are continuously introduced into the chamber by a suitable feed mechanism 2. While the particular physical nature of the coal and sulfide ore is not of especial importance, nevertheless it should be of such form as will facilitate uniform mixing and distribution and provide for rapid coking of the coal. With the ore and coal a suitable proportion of slagging material, such as lime and silica may be added, the lime being in the form of calcium sulfate if desired. The amount of such slagging material and the proportions of lime and silica will be determined by the amount of sulfide ore employed and by the amount of iron and silica already present in the ore. Preferably sufficient slagging material is employed to form an easily fusible calcium iron silicate. Near the bottom of the chamber A suitable tuyères, 3, are provided through which an oxidizing gas comprising a portion of free oxygen is admitted.

When our novel process is employed for the reduction of sulphur dioxide, the oxidizing gas introduced at the tuyères, 3, will also comprise a substantial proportion of sulphur dioxide containing gas. This sulphur dioxide gas may be obtained directly from smelters or roasting furnaces, in which case it will preferably be introduced into the reduction chamber while still hot, thereby conserving fuel and rendering the operations more efficient. Furthermore, if the sulphur dioxide gas be taken directly from the roaster or smelter and conveyed to the reduction chamber without being permitted to cool below the point (about 400° F.) at which sulphuric acid mist will form by the condensation of the water vapor and sulphur trioxide which may be present in the gases, very material advantages are obtained, both in the conservation of heat and in the prevention of corrosion of the metal portions of the reduction apparatus, pipes, pumps, etc. The gas may, however, be derived from other sources and, if cold, may be introduced directly into the chamber A or it may be preheated as desired.

The solid fuel falls downwardly in counter flow to the rising current of oxidizing gas, and upon reaching the bottom or lower portion of the chamber A encounters a comparatively strong oxidizing atmosphere whereby substantially all the sulphur is removed from the sulfide ore and sufficient heat is developed to maintain the reduction process and fuse the ash and cinder. The reactions which take place in the various parts of the reduction chamber A may be most conveniently described in three parts, each representing a zone in the furnace. By way of example, the process will be described as employing pyrites as the sulfide ore and bituminous coal as the carbonaceous material.

In the top of the chamber, zone $a$, a reducing atmosphere is maintained and a large part of the volatile matter in the coal is driven off with the production of coke. Also, the sulfide ore under the influence of heat decomposes to yield free sulphur according to the equation:

$$FeS_2 + heat \rightarrow FeS + S$$

Part of the sulphur thus freed may react with the volatile matter of the coal to yield hydrogen sulfide. Also, the sulphur dioxide arising from the lower zones reacts with the hydrocarbons from the coal and with the hydrogen sulfide produced to yield sulphur vapor, steam, etc. In the middle zone, zone $b$, the atmosphere is maintained substantially neutral or reducing. The coking of the coal commenced in zone $a$, is completed and the coke produced here and in zone $a$ is substantially utilized in the reduction of sulphur dioxide and carbon dioxide ascending from the zone below. The iron sulfide (FeS) resulting from the partial desulphurization of pyrites serves to reduce a portion of the sulphur dioxide according to the equations:

$$3FeS + 2SO_2 \rightarrow Fe_3O_4 + 5S$$
$$2FeS + SO_2 \rightarrow 2FeO + 3S$$

In the bottom zone, zone $c$, the unoxidized iron sulfide descending from zone $b$ is completely burned, owing to the oxidizing nature of the atmosphere in the zone, to yield sulphur dioxide and FeO or $Fe_2O_3$. Likewise any carbon remaining in the charge after passing zone $b$ is burned by the air and sulphur dioxide to carbon dioxide. The sulphur dioxide produced by the oxidation of the sulfide ore in zone $c$ passes upwardly and is reduced in zones $b$ and $a$ to sulphur and hydrogen sulfide. The lime and silica, when added, react in this lower zone $c$ to form silicates which dissolve the cinder and ash forming easily fusible calcium iron silicate.

The heat developed by the oxidation of the iron sulfide to $Fe_2O_3$ or FeO serves to provide a large portion of the heat required to maintain the temperature of the reduction chamber, thereby eliminating to a large extent the use of the more expensive and less available coal and oil for heating purposes.

In order to provide for an easily regulated amount of reducing gases leaving the reduction chamber we have found it advantageous to provide an inlet 6 at the top of the reduction chamber whereby petroleum oil or other liquid or gaseous hydrocarbon may be introduced. It will be obvious to one skilled in the art that the strength of the reducing atmosphere might be varied by a variation in the proportion of coal, but the latter is not subject to such delicate control and the introduction of liquid hydrocarbons permits fine regulation.

As more particularly pointed out in our copending applications, we prefer to employ a carbonaceous reducing agent comprising considerable amounts of volatile hydrocarbon since the presence of such hydrocarbon permits lower temperatures of reduction of the sulphur dioxide in the upper zone and also prevents the formation of objectionable carbon oxysulfide (COS).

When employing our novel process for the reduction of sulphur dioxide certain advantages of great importance are obtained. First, greatly increased gas speeds are attainable owing to the increased rate of reduction of the sulphur dioxide at the higher temperature. Second, an increased proportion of sulfide ores may be used since the reduction of $SO_2$ by the sulfide ore takes place more readily at high temperatures. Third, the ash and cinder may be easily and quickly removed. Fourth, in the regions where sulphur dioxide is produced in large amounts, i. e. in the regions of smelters, pyrites and other sulfide ores are of course present and readily available, whereas coal and oil are often at a premium. Fifth, the production of elemental sulphur from the sulfide ores simultaneously with the reduction of the sulphur dioxide greatly increases the production of sulphur.

When all the sulphur to be recovered in elemental form enters the chamber in the fuel, that is, in the form of sulfide ore, the oxidizing gas will be composed entirely of air or oxygen. In this event, it will be obvious that a larger proportion of sulfide ore may be employed for a given amount of coal since the sulphur dioxide to be reduced by the coal is derived entirely from the ore. The gaseous products of the reduction chamber are removed near the top thereof through the outlet 7 while the ash and cinder in the form of a slag may be removed near the bottom of the chamber through a suitable tap hole 8. The process is so carried on as to maintain a substantially constant depth of bed of solid fuel in the chamber A, the bed gradually falling as fresh coal and sulphide ore are added. By proper regulation of the air, sulphur dioxide, coal, and sulfide ore, admitted to the chamber, it is possible to provide for complete oxidation of the coal and ore, maintain the required temperature for the reduction, and reduce substantially all the sulphur dioxide gas to elemental sulphur.

The gaseous products of the reduction chamber comprise considerable sulphur vapor. However, since the atmosphere in the upper zone of the chamber is quite strongly reducing there will also be present hydrogen sulfide, hydrocarbons, carbon monoxide, as well as inert nitrogen, some carbon dioxide and any unreduced sulphur dioxide. Practically no carbon oxysulfide is to be found in the exit since the formation of this objectionable substance is prevented by the considerable amounts of hydrocarbons derived from the bituminous coal and oil.

In the modified type of reduction chamber as shown in Fig. 2, the solid charge is first in co-current and subsequently in counter-current flow with the oxidizing gas. Certain advantages are realized in this method of operation as more particularly pointed out in our co-pending applications. Serial No. 134,161 and Serial No. 134,162, both filed September 8, 1926.

The solid charge of sulfide ore, carbonaceous fuel, and preferably a suitable proportion of a slagging material, such as lime and silica, is introduced at the top of the reduction chamber A by a suitable feed mechanism 2'. The chamber is also provided at the top with an inlet 4', through which sulphur dioxide gas, air or a mixture thereof may be introduced, and with the inlet 6', through which oil, etc. may be admitted. Near the bottom of the chamber are suitable tuyères 3' through which air or a mixture of air and sulphur dioxide may be admitted. The gaseous products of both co-current and counter-current zones are removed at the offtake 7' located midway of the chamber.

The reactions occurring in the various parts of the chamber A' are substantially the same as those described above and will be apparent to one skilled in the art. In the lower portion of the zone of counter-current flow of gas and solid, the atmosphere is quite strongly oxidizing, due to the considerable proportion of free oxygen in the gas introduced through the tuyères. In this zone the temperature is maintained sufficiently high that the ash and cinder will be fused with the slagging material and may be easily tapped off through a suitable tap-hole 8'.

In case the particular ore employed contains valuable metal constituents such as copper, the desulphurizing of the ore will preferably not be continued to completion but will be stopped at that point where a matte rich in the sulfide of the valuable metal will be formed. Such regulation will be obvious to one skilled in the art of pyritic smelting. The slag and matte may then be withdrawn separately or may be withdrawn in a single stream and subsequently separated.

To provide for the complete interaction of the reducing gases and any sulphur dioxide which may be present, the gas mixture is conducted through conduit 10 to a catalyst chamber B where the gaseous products of the reduction chamber come in contact with a suitable catalyst to aid in the interaction of any unreduced sulphur dioxide with the reducing gases present, i. e., carbon monoxide, hydrogen sulfide, or hydrocarbons to yield elemental sulphur. When the gas mixture from the reduction chamber contains material amounts of soot or other solid carbonaceous matter, these impurities may be removed by mechanical separation, or the gases may be passed through a heated checkerwork where the solid particles are burned to carbon monoxide with carbon dioxide, sulphur dioxide, oxygen, etc. The clean gas is then conducted to the catalyst chamber B.

For regulation of the composition of the gases entering the catalyst chamber, we have provided an inlet 11 in the conduit 10 through which sulphur dioxide or air may be admitted. By a proper control of the amount of sulphur dioxide gas or air admitted through the inlet 11 and the amount of oil admitted through the inlet 6, the composition of the gaseous mixture in the catalyst chamber may be adjutsed so that there will be present in the mixture interacting proportions of reducing and reducible gases. The reduction of the sulphur dioxide by the reducing gases will occur according to the following typical equations:

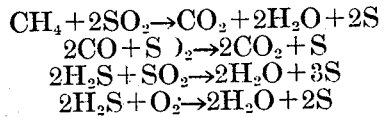

The temperature of the catalyst chamber should be maintained at about 350° C. or above to prevent the condensation of the sulphur vapor and provide for rapid interaction of the gases. This temperature will be readily obtained by the sensible heat in the gaseous products from the reduction chamber and by the heat of interaction of the sulphur dioxide with the reducing gases.

The sulphur vapor and inert gases are removed from the catalyst chamber through the outlet 12 and the sulphur vapor may be condensed by any suitable heat interchange apparatus as for example a waste heat boiler, and collected. The gases leaving the condenser may be treated to remove any residual sulphur mist or vapor by scrubbing with a baffle scrubber, absorption in oil, etc., or the sulphur mist may be electrically precipitated.

Any of the known catalysts for aiding the reduction of sulphur dioxide, such as iron oxide, calcium sulfate, calcium sulfide, etc., may be employed in the catalyst chamber. We have found, however, that particularly good results are obtained when using bauxite, a natural occurring mixture of the oxides of alumina and iron, with other minor impurities. Of the various types of bauxite, that variety commonly known as French bauxite has been found to be particularly useful because of its resistance to disintegration at the temperature employed.

If it is desired to produce hydrogen sulfide by our novel process, it will be found necessary to increase the relative amount of bituminous coal or liquid hydrocarbon whereby the reduction of the sulphur dioxide will continue to hydrogen sulfide rather than elemental sulphur. The proper regulation of the reduction chamber whereby hydrogen sulfide will result, will be obvious to one skilled in the art, in view of the foregoing disclosure.

By way of example in disclosing our novel process, we have specified the use of pyrites or pyrrhotite as suitable sulfide ores. However, other sulfide ores and concentrates similar in type may be used with similar advantage. Likewise, we have referred to the use of bituminous coal as the preferred type of reducing means. However, it will be obvious that other coals and carbonaceous materials may be used, although when employing carbonaceous materials containing small amounts of volatile hydrocarbon, we find it preferable to add oil or other liquid hydrocarbon to overcome this deficiency. According to the preferred method of carrying out our novel process, the charge will contain 10% or more of carbonaceous fuel, and in case a considerable portion of sulphur dioxide gas is admixed with the air employed in the desulphurization of the sulfide ore, the charge may comprise as much as 50% carbonaceous fuel. When employing these proportions of carbonaceous fuel, we practically dispense with the use of steam.

Steam may, however, be introduced into the reduction chamber when desired, to regulate the temperature and to aid in the reduction of the sulfide ore and sulphur dioxide.

In employing the term "oxidizing gas" throughout the specification and claims, we include therein such gases as sulphur dioxide which exhibits an oxidizing effect on carbon or the sulfide ore at the temperatures employed in our process. The term also includes such gases as contain more oxygen than air, such as commercial oxygen or oxygen enriched air.

The reduction process described as taking place in the chamber A may be carried out in the conventional type of blast furnace which is employed in the smelting of copper ores into matte, or in pyritic smelting, such furnace being provided with a closed top. The operation may be carried on at normal pressure or at increased pressure, in which latter case the entire system is maintained under positive pressure, i. e. of the order of several atmospheres.

Various modifications may be made in our novel process without departing from the spirit thereof, and we do not wish to limit the scope except as defined in the appended claims.

We claim:

1. The process of producing elemental sulphur which comprises contacting a mixture of sulfide ore and a carbonaceous material with an oxidizing gas, maintaining a temperature sufficiently high to cause a reaction between the contacting materials and to fuse the non-volatile reaction products, regulating the proportion of carbonaceous material to reduce substantially all the sulphur to the elemental form, and discharging the non-volatile reaction products as a slag.

2. The process of producing elemental sulphur which comprises contacting a mixture of sulfide ore and a carbonaceous material with an oxidizing gas containing substantial amounts of sulphur dioxide, maintaining a temperature sufficiently high to cause a reaction between the contacting materials and to fuse the non-volatile reaction products, regulating the proportion of carbonaceous material to reduce all the sulphur to the elemental form, and discharging the non-volatile products as a slag.

3. The process of producing elemental sulphur which comprises passing a mixture of sulfide ore, a carbonaceous reducing agent and slagging material first through a reducing atmosphere, and finally through an oxidizing atmosphere, maintaining a temperature sufficiently high to fuse the non-volatile products from the solid charge, regulating the proportion of carbonaceous reducing agent to provide for the elimination of substantially all the sulphur in the system in the elemental form, and discharging the non-volatile products as a slag.

4. The process of producing elemental sulphur which comprises contacting a mixture of sulfide ore and a carbonaceous reducing material containing substantial amounts of hydrocarbons with an an oxidizing gas containing substantial amounts of sulphur dioxide, maintaining a temperature sufficiently high to cause a reaction between the contacting materials and to fuse the non-volatile reaction products, providing a large part of the heat required for the reduction of the sulphur dioxide by the oxidation of the metal of the sulfide ore, regulating the amount of carbonaceous reducing material to provide for substantially complete reduction of all the sulphur to the elemental form, and discharging the non-volatile reaction products as a slag.

5. The process of producing elemental sulphur which comprises contacting a mixture of sulfide ore, slagging material and a carbonaceous reducing material containing substantial amounts of hydrocarbons with an oxidizing gas containing substantial amounts of sulphur dioxide, maintaining the temperature sufficiently high to cause a reaction between the contacting materials and to fuse the non-volatile reaction products, regulating the amount of carbonaceous reducing material to provide for substantially complete reduction of all the sulphur to the elemental form, and discharging the non-volatile reaction products as a slag.

6. The process of producing elemental sulphur which comprises contacting a mixture of sulfide ore, slagging material and a carbonaceous reducing agent containing substantial amounts of hydrocarbons in a reducing atmosphere with a co-current flow of a gas containing substantial amounts of sulphur dioxide and then in an oxidizing atmosphere with a counter-current flow of a gas comprising free oxygen, maintaining a temperature sufficiently high to cause a reaction between the contacting materials and to fuse the non-volatile reaction products, and discharging the non-volatile products as a slag.

7. The process of producing elemental sulphur which comprises contacting a mixture of sulfide ore, slagging material, and a carbonaceous reducing agent with a co-current flow of gas in a reducing atmosphere, and then with a counter-current flow of an oxidizing gas in an oxidizing atmosphere, maintaining a temperature sufficiently high to cause a reaction between the contacting materials and to fuse the non-volatile reaction products, and discharging the non-volatile reaction products as a slag.

8. The process of producing elemental sulphur which comprises passing a mixture of sulfide ore, slagging material, and a carbonaceous reducing agent containing substantial amounts of hydrocarbons downwardly through a reducing atmosphere in co-current flow with a gas containing substantial amounts of sulphur dioxide, subsequently passing the mixture through an oxidizing atmosphere in counter-current flow with a gas containing free oxygen, regulating the proportions of sulfide ore, carbonaceous material, sulphur dioxide, and free oxygen, to provide for substantially complete reduction of all the sulphur in the system to the elemental form, maintaining a temperature sufficiently high to fuse the non-volatile products from the solid charge, removing the gaseous products of the upward and downward gas streams at a point intermediate thereof, and discharging the non-volatile products as a slag.

9. The process of producing elemental sulphur which comprises passing a mixture of sulfide ore, slagging material, and a carbonaceous reducing agent containing substantial amounts of hydrocarbons first through a reducing zone in co-current flow with the gaseous products thereof and subsequently through an oxidizing zone in counter-current flow with the gaseous products thereof, maintaining the temperature sufficiently high to fuse the non-volatile products from the solid charge, regulating the amount of carbonaceous reducing agent to reduce substantially all the sulphur in the system to the elemental form and discharging the non-volatile products as a slag.

10. The process of producing elemental sulphur which comprises contacting a mixture of sulfide ore, slagging material and a carbonaceous fuel with an oxidizing gas, said oxidizing gas containing a substantial portion of heated sulphur dioxide, regulating the proportion of carbonaceous fuel to reduce a major portion of the sulphur to the elemental form, and discharging the non-volatile reaction products as a slag.

11. The process of producing elemental sulphur which comprises introducing a charge of sulfide ore, slagging material and a carbonaceous fuel into a heated chamber, introducing an oxidizing gas into said chamber to contact with the solid charge in counter-current flow, maintaining the temperature of said chamber sufficiently high to cause a reaction between the contacting materials and to fuse the non-volatile reaction products, introducing a substantial amount of heated sulphur dioxide containing gas to contact with the charge, regulating the proportion of carbonaceous fuel to reduce a major portion of the sulphur in the system to the elemental form, and discharging the non-volatile products as a slag.

12. The process of producing elemental sulphur which comprises introducing a charge of sulfide ore, slagging material and a carbonaceous fuel into a heated chamber, introducing an oxidizing gas containing free oxygen into said chamber to contact with the solid charge, maintaining the temperature of said chamber sufficiently high to cause a reaction between the contacting materials and to fuse the non-volatile reaction products, introducing a substantial amount of sulphur dioxide gas to contact with the charge, such gas being obtained directly from a roasting or smelting furnace without intermediate cooling below 400° F., regulating the proportion of carbonaceous fuel to reduce a major portion of the sulphur in the system to the elemental form, and discharging the non-volatile reaction products as a slag.

In testimony whereof, we affix our signatures.

RAYMOND C. BENNER.
ALFRED P. THOMPSON.